(12) United States Patent
De Bot

(10) Patent No.: US 12,092,083 B2
(45) Date of Patent: Sep. 17, 2024

(54) METHOD FOR CONTROLLING A WIND TURBINE

(71) Applicant: Wobben Properties GmbH, Aurich (DE)

(72) Inventor: Dennis De Bot, Leusden (NL)

(73) Assignee: Wobben Properties GmbH, Aurich (DE)

(*) Notice: Subject to any disclaimer, the term of this patent is extended or adjusted under 35 U.S.C. 154(b) by 141 days.

(21) Appl. No.: 17/607,740

(22) PCT Filed: Apr. 30, 2020

(86) PCT No.: PCT/EP2020/062121
§ 371 (c)(1),
(2) Date: Oct. 29, 2021

(87) PCT Pub. No.: WO2020/221893
PCT Pub. Date: Nov. 5, 2020

(65) Prior Publication Data
US 2022/0213870 A1 Jul. 7, 2022

(30) Foreign Application Priority Data
Apr. 30, 2019 (EP) .................................... 19172009

(51) Int. Cl.
*F03D 7/00* (2006.01)
*F03D 7/02* (2006.01)
*F03D 7/04* (2006.01)

(52) U.S. Cl.
CPC ........... *F03D 7/045* (2013.01); *F03D 7/0224* (2013.01); *F05B 2270/32* (2013.01);
(Continued)

(58) Field of Classification Search
CPC ...... F03D 7/045; F03D 7/0224; F03D 7/0272; F03D 7/046; F05B 2270/32;
(Continued)

(56) References Cited

U.S. PATENT DOCUMENTS 6,320,272 B1 * 11/2001 Lading .................. F03D 7/0224
290/55
2006/0033338 A1 * 2/2006 Wilson .................. F03D 7/0224
700/282
(Continued)

FOREIGN PATENT DOCUMENTS

WO 2017/167344 A1 10/2017

OTHER PUBLICATIONS

Bossanyi et al., "The Design of Closed Loop Controllers for Wind Turbines," *Wind Energy*, 3:149-163, 2000.
(Continued)

*Primary Examiner* — Matthew T Largi
(74) *Attorney, Agent, or Firm* — Seed IP Law Group LLP

(57) ABSTRACT

A method for controlling a wind turbine using an estimated wind speed is provided. The wind turbine has a rotor rotatable with a variable rotor speed and having rotor blades with adjustable pitch angles and a generator adapted to control a generator torque or a generator output power. The method comprises measuring the rotor speed, determining a common pitch angle representative of at least one or all pitch angles of the rotor blades, determining the generator torque or an output power of the generator and estimating the wind speed by means of an observer. The observer uses a model of the wind turbine as an observer model, uses as input variables, the measured rotor speed, the determined common pitch angle and the determined generator torque or the determined output power, and incorporates expected variations of the wind as at least one stochastic variable.

16 Claims, 3 Drawing Sheets

(52) U.S. Cl.
CPC ... *F05B 2270/327* (2013.01); *F05B 2270/328* (2013.01); *F05B 2270/335* (2013.01)

(58) Field of Classification Search
CPC .......... F05B 2270/327; F05B 2270/328; F05B 2270/335; F05B 2260/821
See application file for complete search history.

(56) References Cited

U.S. PATENT DOCUMENTS

| | | | |
|---|---|---|---|
| 2015/0285222 A1* | 10/2015 | Chauvin | F03D 7/0224 290/44 |
| 2016/0350453 A1* | 12/2016 | Walls | G06F 30/20 |
| 2018/0017039 A1* | 1/2018 | Davoust | F03D 7/0224 |
| 2022/0213868 A1* | 7/2022 | Collet | F03D 7/0224 |

OTHER PUBLICATIONS

Verhaegen, Michel & Verdult, Vincent, *Filtering and System Identification: A Least Squares Approach*, Cambridge University Press, New York, NY, 2007, 426 pages.

Scherer, "Theory of Robust Control", May 2007, 160 pages.

Soltani et al., "Estimation of Rotor Effective Wind Speed: A Comparison," *IEEE Transactions on Control Systems Technology* 21(4):1155-1167, 2013.

Song et al., "Kalman Filter-based Wind Speed Estimation for Wind Turbine Control," *Int. J. Control Autom. Syst.* 15(3):1089-1096, 2017.

* cited by examiner

METHOD FOR CONTROLLING A WIND TURBINE

BACKGROUND

Technical Field

The present invention is directed to a method for controlling a wind turbine. The present invention is also directed to a wind turbine which is controlled accordingly.

Description of the Related Art

Wind turbines are well known, they generate electrical power from wind. In modern wind turbines it is common to adapt the control of the wind turbine to the prevailing wind conditions, in particular to the prevailing wind speed. However, it is also well known that measuring the wind speed may have some disadvantages or problems. One problem is that measuring the wind speed is either not very precise and not very reliable or it is complicated and expensive.

Further problems occur and should be considered. One of such problems is that the area swapped by the rotor blades of the rotor of modern wind turbines may even become as large as 10,000 m². In such a large area which can thus have a height of more than 100 m the wind conditions may vary throughout this area swapped, in particular the wind conditions may vary with the height. That makes it even more difficult and is expensive to either identify a representative single wind speed for the whole wind turbine, or to consider different wind speeds at different locations in the area swapped by means of the controller.

Accordingly, one fairly robust method is still common, i.e., not to measure the wind speed or not to use measured wind speed values for the control of the wind turbine, but to control the wind turbine based on characteristic curves.

One such characteristic curve to be used for controlling is a so called rotational speed-power-curve. According to that method the rotational speed-power-curve is determined when designing the wind turbine and such rotational speed-power-curve is deposited in a controller. When controlling the wind turbine the controller sets a power in dependence of the rotational speed according to the rotational speed-power-curve. If said power according to this curve matches the power derived from the wind, a stable operating point is found, otherwise the rotational speed of the wind turbine will continue to change resulting in a new power according to the rotational speed-power-curve. In this way finally a stable operating point will be found. As a result the wind turbine is controlled depending on the wind speed whereas the wind speed is not measured. In other words the wind turbine has basically measured the wind speed by means of its own aerodynamic rotor.

However, some drawbacks exist for this method. One is that this concept is mainly designed for a partial load situation which may also be depicted as a sub-rated situation. It also incorporates the simplified strategy to use one fixed blade angle for all rotor blades throughout the whole partial load operational area. Accordingly, that makes this concept more complicated or less flexible.

The European Patent Office has cited the following prior art documents in the priority application to the present PCT application: US 2015/285222 A1, WO 2017/167344 A1 and the following Articles: Soltani et al. "Estimation of Rotor Effective Wind Speed: A Comparison," Song et al." "Kalman Filter-based Wind Speed Estimation for Wind Turbine Control" and Bossanyi "The Design of Closed Loop Controllers for Wind Turbines."

BRIEF SUMMARY

One or more embodiments are directed to improving control of a wind turbine in dependence of the wind speed.

A method for controlling a wind turbine uses an estimated wind speed is provided. The underlying wind turbine has a rotor rotatable with a variable rotor speed and having rotor blades with adjustable pitch angles. Thus, the rotor blades of the rotor can be adjusted with respect to their position to the wind in particular with respect to an angle of attack.

There is further a generator adapted to control a generator torque or a generator output power. A synchronous generator may be one possibility to provide such generator. The generator torque of such synchronous generator can be adjusted by means of controlling the stator current. One such synchronous generator may have constant magnets and is thus a so called permanently excited generator. However, there may also be an externally excited generator in which the excitation of the generator rotor, also called runner, is excited by means of a controllable excitation current. Such excitation current can as well be used to control the generator torque.

As one step the method comprises measuring the rotor speed. This can be done by providing a sensor such as an incremental encoder at a rotational shaft of the rotor and/or of the generator.

In addition, a common pitch angle representative of at least one or all pitch angles of the rotor blades is provided as a further step. Such pitch angle can be measured by a sensor attached to the bearing or in the proximity of the bearing of the rotor blade. Alternatively, corresponding pitch motors may provide the angle position of each rotor blade as the corresponding pitch angle. Alternatively or in addition the controller may just use set values for the pitch angles.

If all blades are adjusted synchronously, all pitch angles of the rotor blades are the same and thus also form the common pitch angle. However, in some variations the blades may additionally be adjusted individually. One possible strategy is to provide a common pitch angle for all rotor blades generally adapted to the prevailing wind speed wherein in addition smaller changes of the blade position may be performed individually in view of individual loads on each blade. However, such additional individual adjustments of the blades shall not differ too much from the other rotor blades. One possibility to determine such common pitch angle is to just use an average value of all pitch angles. Preferably, a set common pitch angle according to a set value of the controller may be used as the common pitch angle.

Further, the generator torque or an output power of the generator is determined. That may of course include that the generator torque and the output power are both determined, but is just less complex to use just one of these. The output power of the generator can be determined by measuring the electrical output power the wind turbine provides for feeding into an electrical supply grid. Such value is often available by the converter which outputs said output power.

The generator torque may be calculated based on such output power and the rotor speed. Alternatively, the electrical output values of the generator, in particular the stator current and the stator voltage may be measured and a generator power output may be derived from that measured values. Based on this generator power and the rotational speed a generator torque may also be calculated.

For estimating the wind speed the method proposes to use an observer. Such observer uses a model for the wind turbine as an observer model. The general idea is that the observer model receives the same input values as the wind turbine and thus also behaves like the wind turbine. In that case all values of the observer model, which are readily apparent in the controller on which this observer model is running, can be taken as the estimated values of the wind turbine.

However, the main input variable of the wind turbine is the wind speed. As the wind speed is difficult to measure, using an observer is suggested to estimate the wind speed and accordingly the wind speed is not available as an input variable of the observer model. Instead the observer model may be used without an input variable.

Nevertheless, the observer model operates similar to the wind turbine and this way provides output variables as estimated variable corresponding to measured variable of the wind turbine. The observer model may be adjusted depending on differences between the estimated values and corresponding measured values, i.e., the measured rotational speed is compared with the estimated speed and the resulting speed difference may be used for adjusting the observer model.

In order to do that such measured values may be inputted into the observer, but inside the observer such values may be used to be compared with output variables of the observer model.

It is suggested that the observer uses as input variables the measured rotor speed, the determined common pitch angle and the determined generator torque or the determined output power respectively. In addition, the observer incorporates expected variations of the wind as at least one stochastic variable. In particular, expected variations of the wind speed are incorporated as at least one stochastic variable.

This way the wind speed is considered in the observer, but not by using it as an input variable of the observer model, as it is not available or at least not in good quality. This way a solution is provided that may estimate the input variable of the wind turbine, i.e., the wind speed.

Such expected variations of the wind speed could be found based on a weather forecast. Such expected variations may also be found based on experiences, e.g., such that depending on variations of the measured rotational speed variations of the wind speed can be estimated.

However, most importantly such expected variations of the wind, in particular of the wind speed, are at least in the first step introduced as at least one mathematic variable that may be left open when designing the observer. Once the observer is designed, assumptions may be made for the expected variations of the wind or wind speed, such as a reasonable standard deviation. Such reasonable standard deviation may be received from experiences or from measurements of the site where the wind turbine is running or is to be set up.

This way expected variations of the wind and in particular expected variations of the wind speed can be incorporated in the observer and this way the basically not predictable fluctuation of the wind can still be considered. It may be considered as disturbances.

According to one aspect, the observer is provided as a Kalman filter. Such Kalman filter provides a concept and observer structure that can consider stochastic variables. This way a Kalman filter can effectively be used for the suggested observer and the Kalman filter can incorporate expected variations of the wind and in particular expected variations of the wind speed as at least one stochastic variable. This way the wind speed can be estimated using a Kalman filter.

According to one aspect the observer model provides as output variables, an estimated rotor speed, an estimated common pitch angle and an estimated generator torque or an estimated output power, to be compared with the corresponding input variables of the observer, i.e., with the measured rotor speed, the determined common pitch angle and the determined generator torque or the determined output power respectively.

Therefore, the measured rotor speed, the determined common pitch angle and the determined generator torque or the determined output power respectively are input variables of the observer and are compared with corresponding output variables of the observer model.

According to one embodiment it is suggested that the wind turbine is controlled depending on the estimated wind speed, and in particular the pitch angles are adjusted depending on the estimated wind speed.

Accordingly, the control concept is to estimate the wind speed and to control the wind turbine based on that, rather than just control the wind turbine based on a rotational speed-power-curve or rotational speed-generator-torque-curve. By estimating the wind speed a reliable information on the wind speed can be derived. Depending on the particular design of the observer, in particular selected time constants and/or selected dynamic behavior, the observer also fulfils the object of filtering. Accordingly, the estimated wind speed can be provided with few noise without introducing a long time lag which is known from regular filters with large filter constants. Based on that the wind turbine can directly be controlled based on the wind speed.

One particular advantage is that this way the estimated wind speed is a reliable input value. In addition the wind speed, or the estimated wind speed, is basically an input variable that is independent of the control of the wind turbine.

Contrary to this, control strategies that do not use the wind speed as an input variable assume a particular control setting of the wind turbine. To give one example, if the wind turbine is controlled only based on a rotational speed-power-curve, that particular curve assumes a particular blade angle or common blade angle. If this blade angle is changed, a new rotational speed-power-curve might be necessary to be used for such amended control setting. If a plurality of rotational speed-power-curves are used, an additional problem arises, i.e., how to change in between such rotational speed-power-curves.

By using the estimated wind speed as an input variable these problems do not occur, even though the observer should of course be adapted to changes in the control setting.

Adjusting the pitch angles depending on the estimated wind speed allows to amend the control strategy in the partial load area, in particular in the transition area from partial load mode to full load mode. One possible advantage is to avoid the most stressful situation for the wind turbine in particular for the rotor blades. This most stressful situation occurs where the partial load mode changes to the full load mode, as at that point the wind is already quite strong whereas the rotor blades are, when coming from the partial load mode, not yet pitched and thus receive the full wind load. In any situation with less wind speed, the load by the wind is also smaller. At any situation with higher wind speed the rotor blades are partly pitched out of the wind and thus receive less stress.

Accordingly, in this region one control strategy would be to pitch the blade angles somehow before reaching the nominal wind speed, i.e., for wind speed values which are 1 m/sec or 2 m/sec below rated wind speed to reduce this stress at this point of maximum stress. Now such change in the control strategy can easily be realized when using the estimated wind speed as a control input. Strategies for changing the blade angle can easily be defined based on a particular wind speed.

In addition or alternatively the generator torque or the output power respectively is adjusted depending on the estimated wind speed. This is particularly proposed when the control is based on a generator torque characteristic or on an output power characteristic. In that case the observer model uses such characteristic as well and the observer uses as an input variable the determined generator torque and will compare it with an estimated generator torque. Alternatively, if the determined output power is used by the control, the observer model uses an estimated output power as well and the observer receives as an input variable the determined output power to compare it with the estimated output power of the observer model. Thus, whether the generator torque or the output power is used depends on the general control concept and may depend on the type of wind turbine that is used.

According to this suggested aspect the generator torque or the output power is an input variable for the observer and the output of the observer, i.e., the estimated wind speed, is used to adjust the generator torque or output power respectively. It is suggested to thus adapt the observer model to the control strategy. This aspect enables the control of the wind turbine to directly use the estimated wind speed as an input parameter rather than using the wind speed indirectly by controlling the generator torque or output power respectively depending on a rotor speed according to a characteristic curve.

In addition or alternatively a further aspect is that the observer model comprises at least one sub model and each sub model represents a dynamic characteristic of one of the following.

According to one aspect the dynamic characteristic of an aerodynamic wake is modelled. Such aerodynamic wake may also be depicted as an aerodynamic inflow, just to use a different word. However, an aerodynamic wake describes the dynamic effect that any wind force, in particular any changes of wind force acting on the rotor is not directly acting on the acceleration and thus on the rotational speed of the rotor. Due to several dynamic characteristics of the wind turbine, in particular of the rotor, there may occur a time lag as well as a dynamic change of the wind force acting on the rotor to the final effect which can be observed in the rotational speed. Such dynamic characteristic of an aerodynamic wake may be modelled by using a low pass filter 1st order, or in a more complex way.

A particular part of the aerodynamic wake is a rotor wake. Such rotor wake describes a time varying effect of the axial and/or tangential induction velocity in the rotor plane. Accordingly, any wind force acting on the rotor is kind of collected by all rotor blades over the whole length of all rotor blades. All this comes together to finally form one value.

In addition, it was realized that as turbine operational quantities vary over time the induction velocity components will lag behind due to the acceleration and/or de-acceleration of the wind at the rotor plane. In particular, that means that such turbine operational quantities are not necessarily readily available as they may vary over time.

Reasons for this might be a misalignment, a pitch angle, a rotor speed and/or the upstream wind speed. Considering and/or adapting this might cause a time lag. Such time lag or other time lags of the aerodynamic wake may cause an additional rotor thrust and/or rotor torque in addition to the stationary rotor thrust and/or rotor torque. Such effects are considered in the dynamic characteristic of an aerodynamic wake. Such aerodynamic wake and thus its dynamic characteristic may be quite complex. However, one possibility to determine such dynamic characteristics is to run simulations for the particular wind turbine. It might also be possible to identify such dynamic characteristic of an aerodynamic wake by making offline measurements and measuring the effect of changes of the incoming wind to the resulting effect to be measurable at the rotational speed.

According to one aspect a dynamic characteristic of at least one of the rotor blades is used. Accordingly, the observer model includes such characteristics as a sub model, in particular a simplified model of the rotor blades. Such sub-model or simplified model can in particular be or include a linear model of second or third order for modelling the swinging or bending behavior for each rotor blade from its rotor blade root to its rotor blade tip. This way the rotor blades are considered in more detail than just assuming a stiff rotor blade. Such stiff rotor blade would basically just transform a particular wind speed depending on the particular blade angle and the current rotational speed of the rotor into a single mechanical torque on the hub of the rotor. As a result any oscillating behavior of the rotational speed and the generator torque, or the rotational speed and the output power respectively, would incorrectly be assumed to have corresponding oscillations in the wind speed. In order to improve that said sub-model or simplified model of the rotor blades is used.

Thus it is possible and suggested to use a sub-model for representing the dynamic characteristic of at least one of the rotor blades.

According to one aspect a sub-model may represent a dynamic characteristic of the drive train. The drive train basically connects the aerodynamic rotor mechanically to the electrodynamic rotor of the generator and thus to the runner of the generator. Runner is just a different term for the electrodynamic rotor of the generator. This mechanical connection has its own characteristic and in particular a dynamic behavior may be observed for transmitting the rotational movement of the aerodynamic rotor to the rotational movement of the runner with respect to the generator in particular with respect to the stator of the generator.

Accordingly, any mechanical movement of the stator with respect to its mechanical support to the nacelle in particular to a machine carrier in the nacelle may also be part of the dynamic characteristic of the drive train. However, if a gear is used between the aerodynamic rotor at the generator the behavior of the gear may also be part of the dynamic characteristic of the drive train.

Such dynamic characteristic can be identified by monitoring the behavior of rotational movement of the aerodynamic rotor and at the same time the resulting behavior of the runner with respect to the generator. These two monitored, in particular measured, rotational behaviors may then be compared and the dynamic characteristic of the drive train can be derived by using a simulation or by using known tools of control theory.

The advantage of considering the dynamic characteristic of the drive train is to improve the observer model. For idealistic stationary behavior the dynamic characteristic of the drive train may not be relevant. However, for changes, in particular accelerations and de-accelerations of the aerodynamic rotor such dynamics of the drive train may be helpful to get an appropriate observer model or to improve the observer model with respect to a strategy that does not take the dynamic characteristic of the drive train into account.

According to one aspect another sub-model is used representing a dynamic characteristic of the generator. In particular ripples of the torque of the generator may be part of the dynamic characteristic of the generator. Such ripples or the corresponding dynamic characteristic of the generator may be derived by simulations or tests of the wind turbine in the field. Considering such dynamic characteristics of the generator, in particular such ripples, may also improve the observer model.

This particularly helps to distinguish between wind gusts and the behavior of the generator and also between possible oscillations of the drive train and torque ripples of the generator. For identifying and/or considering such torque ripples or other behavior of the generator the stator current produced by the generator may also be taken into account. This is suggested for identifying such dynamic characteristics of the generator and also or alternatively when using such sub-model representing dynamic characteristics of the generator as part of the observer model. In this respect one suggestion is to use the stator current as an input variable of the observer as well.

According to one aspect a sub-model may represent a dynamic characteristic of at least one actuator for adjustment of at least one of the pitch angles. Such actuator may be provided for each rotor blade and thus each actuator adjusts one of the pitch angles. The dynamic characteristic of such actuator, in particular a pitch drive, influences a dynamic of the change of such pitch angle of a rotor blade. In particular, for changes in the wind speed or changes in the wind behavior in general may result in adjustment of the rotor blades. Common pitch angles or individual pitch angles may refer to given pitch angles in particular according to set points, set by a controller of the wind turbine.

However, in order to change the pitch angles there is a dynamic characteristic for starting and running the particular actuator and in particular for the rotor blade to be turned. Considering this dynamic characteristic of such actuators may also improve the observer model. Such dynamic characteristic of the actuator may be received by running simulations or by taking measurements on a wind turbine during a test situation.

According to a further aspect a sub-model may also represent a dynamic characteristic of the tower. In particular, the tower may during operation bend back and forth according to the wind. Such dynamic behavior also influences the actual wind force on the aerodynamic rotor. Such dynamic behavior of the tower may be derived by running simulations or monitoring the behavior during running of the wind turbine. The dynamic characteristic of a tower may also include a sidewise movement of the tower. It may also comprise a swinging mode of a higher order, higher than just a single swinging mode in which the head of the tower swings back and forth or sidewise. Such swinging of high order may include a swinging mode in which the tower may take an S-form. This also improves the observer model.

According to one aspect the sub-model may represent a dynamic characteristic of a structural imbalance. Such structural imbalance is basically a collective name for disturbances caused by the presence of structural components, such as the tower with respect to rotor blades. Accordingly, a rotor blade passing the tower, i.e., passing the tower shadow, may result in such imbalance. In addition or alternatively such structural imbalance may be or may be caused by imperfections of structural components. Such imperfections may be a blade mass imbalance and/or a rotor speed sensor imbalance.

Taking such structural imbalance into account may help to distinguish between effects caused by the wind, in particular caused by a gusty wind on the one hand and behavior caused by such structural imbalance on the other hand. In particular, by monitoring cyclic movements the dynamic characteristic of such structural imbalance may be identified and put into a sub-model. There might be a plurality of structural imbalances and these may however be integrated into the dynamic behavior for all identified and for all relevant structural imbalances.

According to a further aspect a sub-model may represent a dynamic characteristic of a rotor wind distribution of a rotor field covered by the rotor when rotating. This takes into account that the wind in particular the wind speed is not identical throughout the whole rotor field covered by the rotor when rotating. Such rotor field may also be depicted as the swapped area, swapped by the rotor blades of the rotor. Such rotor wind distribution may be selected depending on a wind speed and based on a wind speed dependent table. Such wind speed dependent table may have information of such rotor wind distribution depending on the wind speed and such information may have been collected during operation of a wind turbine using a particular device for wind measurement such as a light detection and ranging (LIDAR).

However, there may also be just a generalized sub-model representing such dynamic characteristics of a rotor wind distribution. Such model may be a two dimensional description of the rotor wind distribution in a generalized form by using at least two variables. One possibility is to assume that the distribution of the wind speed may be described by a polynomial of second order for each direction, i.e., for the vertical direction and for the horizontal direction. Such generalized distribution model or distribution description may be put into place inside a control program. By measuring or observing some wind speeds within the rotor field the variables of such generalized sub-model of dynamic characteristics of the wind distribution may be set or adapted.

Accordingly, in this way an information for the whole rotor field may be derived. This way the observer model may also be improved. In particular, one possibility is to use at least one measured wind speed or observed wind speed as an additional input for the observer and that may be used to further adapt the observer model. Based on this at least one measured or observed wind speed and using a sub-model representing the dynamic characteristics of the rotor wind distribution the wind forces on the rotor blades may be considered with more accuracy in particular with more details.

According to one aspect the observer considers at least one non-linear characteristic of the wind turbine such that a linear observer model is used and the at least one non-linear characteristic of the wind turbine is considered by at least one time variant parameter.

A non-linear characteristic or a non-linear behavior means, based on a general definition of non-linearity that an amplification factor depends on the magnitude of a signal to be amplified. Accordingly, a non-linear description needs to use particular functions reflecting such magnitude depending amplification factor. That makes a non-linear system and in particular a non-linear control and also a non-linear observer become quite complex and difficult to handle and in particular difficult to generalize.

To avoid this problem it was realized that at least some signals, such as the rotational speed, the determined common pitch angle and the determined generator torque or the determined output power of a wind turbine do not significantly change within a short time. Accordingly, many other parameters inside the wind turbine which depend on these variables may also not change too quick. Based on that it was realized that a linear system may be used even for a non-linear characteristic of the wind turbine. The non-linearity of such characteristic may still be taken into account by simply changing the relevant parameters. Thus, at least one variable is a time variant variable.

According to a further aspect, the observer model incorporates a blade model of at least one of the rotor blades and the blade model comprises a plurality of blade sections of the rotor blade in order to consider dynamic characteristics of the blade sections and in addition or alternatively the blade model comprises a sub-model for modelling a torsional characteristics and/or of the blade sections.

It was realized that nowadays rotor blades are quite large and that considering these as a single stiff component may not be adequate. Accordingly, incorporating a blade model of at least one of the rotor blades is proposed for the observer model as already suggested with respect to another aspect. However, in addition it is suggested that the blade model comprises a plurality of blade sections. This way the rotor blade can better be taken into account by such blade model.

The blade sections may be sections with respect to the length of the rotor blade from the rotational axis of the rotor, i.e., basically from the blade root to the blade tip. One possibility is to subdivide the rotor blades, just virtually, into three sections, an inner third, an outer third and the remaining middle third. However, these sections do not necessarily need to be of identical length.

It was realized that there are particularly different aspects of different sections of the rotor blade. The outer section is mainly influenced by the wind. The middle section is influenced by the wind and by the movement and force received from the outer section. The inner section is not influenced very much by the wind and particularly influenced by the force transmitted by the middle section which includes the force the middle section received by the outer section. One reason for the outer section being mostly influenced by the wind is the fact that the outer section is also moving fastest.

Accordingly, it is preferred that each rotor blade is virtually subdivided into an inner section, an outer section and a middle section.

In addition or alternatively it is suggested that the blade model comprises a sub-model for modelling a torsional characteristics of the blade. This may also or only be a sub-model for modelling torsional characteristics of each blade section. It was realized that the torsional movement of such rotor blade, i.e., a torsion with respect to a rotor blade axis extending from the rotor blade root to the rotor blade tip may be significant. It results in additional mechanical forces and it also results in changed angles of attack between the wind and the rotor blade. These may even result in an inadequate airflow, i.e., in a stall. If such torsional movement appears, such stall may however just appear in parts of the rotor blade. One possibility is that such stall mainly occurs in one of the three sections. Accordingly, taking such torsional movements into account may also improve the observer model. Such sub-model for modelling a torsional characteristics may be derived from simulations of the designed rotor blade. It may also be derived from aerodynamic tests of the rotor blade in a flow channel.

According to one aspect the observer model has a plurality of model parameters and the observer model, at least its model parameters or some of them, is determined by a system identification or parameter identification respectively. Accordingly, it is suggested to use a system identification to identify the observer model with respect to its parameter and as well as with respect to its structure, at least with respect to its order. However, it is suggested to predetermine the structure of the observer such that the observer model has three output variables, i.e., the rotor speed, the common pitch angle and the generator torque. As an alternative to the generator torque the output power may be used as an output. Based on this structure the observer model may be identified.

That may be performed by monitoring the behavior of the wind turbine in that respect, i.e., to monitor the output variables, i.e., said three output variables, as a response of the wind turbine to the wind speed as an input signal. For such identification a particular wind speed sensor may be used for monitoring the wind speed. Once the model is determined based on such identification the wind speed sensor is not needed any more.

Any of the sub-models may be determined by a similar identification. However, simulations may also be used.

Another approach is to provide the general structure and this structure generally reflects the actual structure of the wind turbine. All that needs to be identified are the parameters. In particular, any amplification factors. If there is a non-linearity, such identification needs to distinguish between different magnitudes of the stimulation of the wind turbine for identification.

This way any relevant structures and any relevant dynamic behaviors may be considered. All above suggested possible sub-models, at least some of them, may be introduced as well. This way a good and reasonable structure can be provided and the parameter identification helps to identify these parameters and such identification may be repeated once in a while when a change of parameters may be assumed.

Alternatively or in addition the observer model, at least its model parameters or some of them, and/or a control for controlling the wind turbine will be adjusted in dependence of the estimated wind speed and optionally in dependence of a measured wind speed.

Accordingly, the wind speed is not only observed in order to use it for controlling the wind turbine, but it may also in a recursive process be used to even improve the observer model and/or the control of the wind turbine.

An even further improvement may be achieved by also using a measured wind speed. Measuring such wind speed cannot replace the observer of the wind speed, but it may be used as an improvement. One improvement is to possibly further adapt the observer model and/or the control when comparing the observed wind speed and the measured wind speed. Particularly it is suggested to switch between estimated wind speed and measured wind speed for controlling the wind turbine according to a fairly simple suggestion. The underlying idea is that in some situations the wind speed may be measured with high accuracy and with high reliability, i.e., when the wind speed is small, steady and the wind turbine is hardly moving. On the other hand with very high and gusty wind speeds it is difficult to measure the wind speed and in that case it might be better to use the observed wind speed.

However, as there is a continuous shift between very low wind speeds and very high wind speeds there may also be a continuous shift between using measured wind speed and using observed wind speed. Accordingly, one suggestion is to use the estimated wind speed and the measured wind speed each by using an individual weighting function. In other words this enables to make the measured wind speed more dominant when there are good and reliable measurements and on the other hand make the estimated wind speed more dominant when the operation of the wind turbine provides good values for the estimated wind speed.

According to one aspect the observer and/or the observer model is designed such that the observer estimates a wind speed and/or a wind field upstream of the rotor. The position upstream of the rotor may be just 5 meter or up to 100 meters or in a range of 10 to 20 meters upstream of the rotor, i.e., of the aerodynamic rotor. The underlying idea is that the observer output provides a value that may be an adequate input value for the controller of the wind turbine. Such wind speed shall also not be influenced by the wind turbine.

This can be achieved such that the observer model reflects a corresponding relationship between the wind upstream of the rotor and any other operational values of the wind turbine considered by the observer model. The dynamic transition of the wind from its upstream position to the rotor blades may be modelled by a corresponding sub model.

According to one aspect the wind speed is measured, in particular by means of LIDAR, and a wind speed value is determined depending on the estimated wind speed and the measured wind speed, in particular such that the estimated wind speed and the measured wind speed are combined using a weighting function and wherein optionally the weighting function depends on an accuracy of the observer and/or on an accuracy of the measurement. Accordingly, the wind speed value which may finally be used for controlling the wind turbine is a combination of the estimated wind speed and the measured wind speed. As explained above it may depend on different situations which of the estimated wind speed and the measured wind speed is more accurate and/or more reliable. The measured wind speed may also be used to generally verify the estimated wind speed.

It is an advantage to measure the wind speed by means of LIDAR, as such LIDAR may measure the wind speed upstream of the rotor, i.e., upstream of the rotor plane, i.e., the area swapped by the rotor blades. A LIDAR may also be used to measure the wind speed not just at one single point but to measure a wind field.

Preferably the weighting function depends on an accuracy of the observer and/or on an accuracy of the measurement. This is particularly directed to the accuracy of the observed wind speed and the accuracy of the measured wind speed respectively. Information on the accuracy of the observer and/or the measurement may be obtained by tests or simulations. In such tests or simulations there may be derived an information on how the accuracy depends on the actual wind speed, or possibly how it depends on other parameters such as temperature. However, regarding the wind speed, that can at least vaguely be obtained by the observer or the measurement and depending on such vague information on the wind speed the accuracy of the observer and the measurement can be derived from this wind speed. For assuming the accuracy and thus for selecting or adjusting the weighting function such vague information on the wind speed is sufficient.

However, other methods are possible such as running the method for controlling the wind turbine depending on an initial value of the accuracy and depending on the observed wind speed adjusting the assumed accuracy and/or adjusting the used weighting function.

According to one aspect a movement value representing a movement of an element of the wind turbine carrying a sensor, in particular a movement of a stator of the generator carrying a speed sensor for measuring the rotor speed, is inputted into the observer as a disturbance value. It was thus realized that the wind turbine as such may be moving, e.g., parts in the nacelle due to a movement of the tower, or due to the machine carrier not being absolutely stiff. It was realized that such movement of the sensor, in particular when the sensor itself measures a movement, such as the rotor speed, can easily be considered as a disturbance value, as the observer is designed for considering disturbances. This may however also make sense for other sensors such as a sensor for measuring the wind speed or even for a sensor for measuring an air pressure, to give a further example.

According to one aspect the observer model is designed such that an upstream wind speed, upstream of the rotor is used as an augmented state variable of the observer model. It was realized that the upstream wind speed which is basically a free upstream wind speed in that it is not yet disturbed by the rotor, is a good variable to control the wind turbine. As it also directly influences the operation of the wind turbine it is suggested to expand the observer model strictly directed to the wind turbine only to this upstream wind speed. This way the upstream wind speed can be incorporated in the observer and this way all interrelationships with this upstream wind speed and the wind turbine is incorporated in the observer.

A simple way of incorporating this upstream wind speed as a state variable is to use a generalized linear partial model of first order, such as a low pass filter 1st order, from the upstream wind speed to an input wind force or thrust of the rotor. It may of course also be modelled in a more complex way.

Such incorporating of the upstream wind speed may also be understood as being parameterized by a random walk model.

It is assumed that the upstream wind speed which is used as augmented state variable of the observer is the wind speed at a location of 50-500 m upstream of the rotor, in particular 100-300 m upstream of the rotor.

A wind turbine is provided. The wind turbine is adapted for using an estimated wind speed for controlling the wind turbine and the wind turbine has
    a rotor rotatable with a variable rotor speed and having rotor blades with adjustable pitch angles,
    a generator adapted to control a generator torque,
    a turbine controller for controlling the wind turbine
    a speed sensor for measuring the rotor speed,
    a pitch determining unit for determining a common pitch angle representative of at least one or all pitch angles of the rotor blades,
    a generator power unit for determining a generator torque or an output power of the generator,
    an estimation unit having an observer for estimating the wind speed by means of the observer, wherein
    the observer is adapted for
    using a model of the wind turbine as an observer model, using as input variables,
    the measured rotor speed,
    the determined common pitch angle and
    the determined generator torque or the determined output power, and incorporating expected variations of the wind as at least one stochastic variable.

Accordingly, the wind turbine is designed such that it may be controlled by using a method according to at least one method or aspect of a method explained above. It is particularly suggested that such method is incorporated or implemented in the turbine controller.

According to one aspect of the wind turbine it is suggested that the observer is provided as a Kalman filter.

BRIEF DESCRIPTION OF THE SEVERAL VIEWS OF THE DRAWINGS

The invention is now described by means of example based on at least one embodiment and using the accompanying Figures.

DETAILED DESCRIPTION

Figure 1:
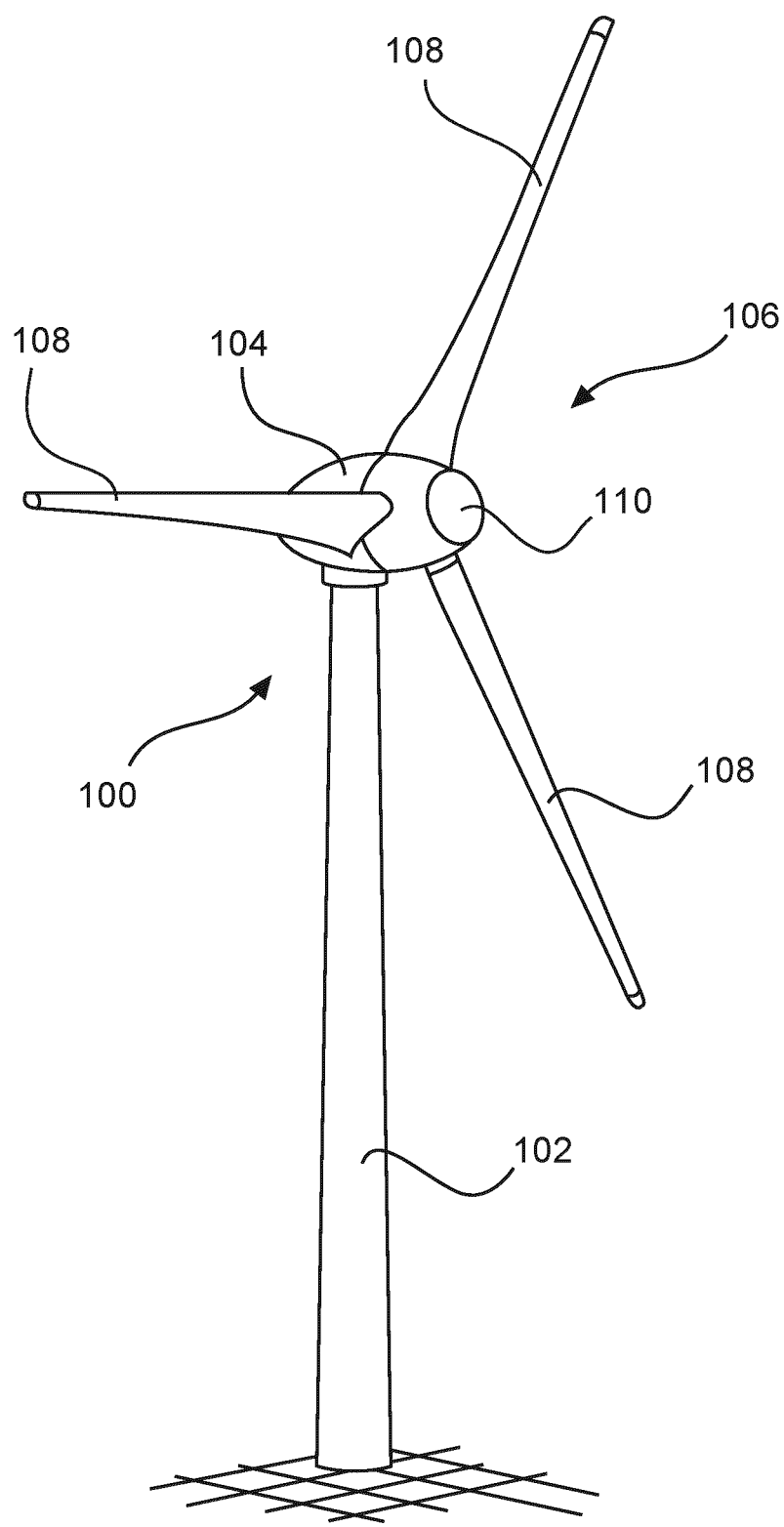
FIG. 1 shows a wind turbine in a perspective view.

FIG. 1 shows a wind power installation 100 comprising a tower 102 and a nacelle 104. A rotor 106 having three rotor blades 108 and a spinner 110 is arranged on the nacelle 104. The rotor 106 is set in rotation motion by the wind during operation and drives a generator in the nacelle 104 as a result.

Figure 2:
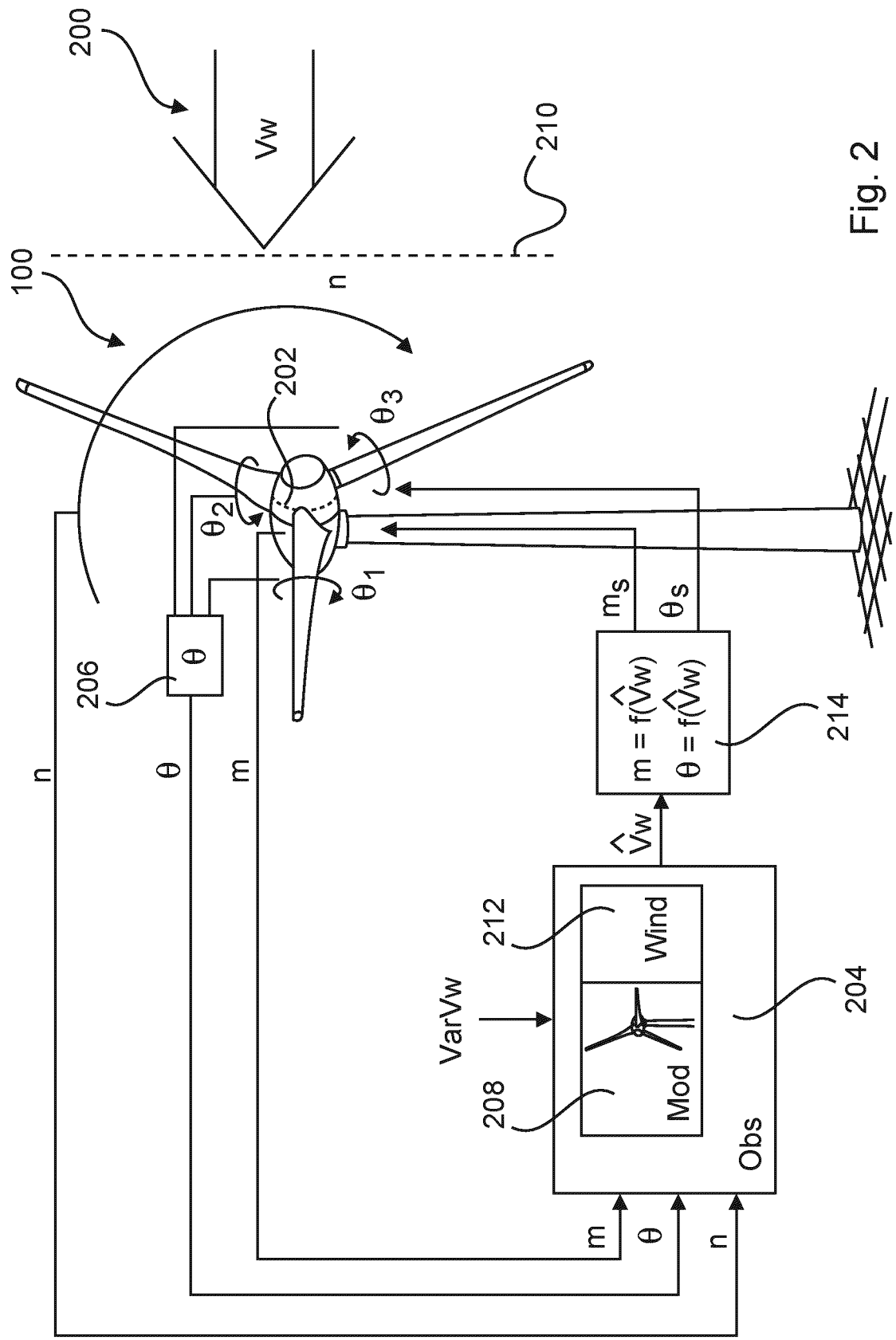
FIG. 2 illustrates the suggested control concept using an observer.

FIG. 2 shows the same wind turbine 100 as in FIG. 1. However, for illustrative reasons the reference numerals of FIG. 1 are not shown but would be the same. In addition, aspects of the control concept are illustrated.

The wind 200 is illustrated as a big arrow and it has the wind speed $V_W$. This is coming from the front of the wind turbine 100 and acting on the rotor blades 108 and thus the rotor 106 depicted in FIG. 1. That leads to a rotation with the rotor speed n. The wind turbine also comprises a generator 202 indicated by two-dotted lines inside nacelle. The rotor blades may be adjusted with respect to their pitch angle and that is indicated in FIG. 2 by a small arrow for each rotor blade and depicted by the corresponding pitch angle $\theta_1$, $\theta_2$ or $\theta_3$ respectively. The rotor speed n thus depends on the wind 200 and thus the wind speed $V_W$ and on the actual pitch angles $\theta_1$, $\theta_2$ and $\theta_3$ and it also depends on a generator torque of the generator 202.

The pitch angles $\theta_1$, $\theta_2$ and $\theta_3$ may be adjusted individually. However, for a general operation of the wind turbine 100, in particular in a stationary operation point and a quite steady wind speed these three pitch angles $\theta_1$, $\theta_2$ and $\theta_3$ should be similar, probably identical. However, even in less ideal situations when these three pitch angles $\theta_1$, $\theta_2$ and $\theta_3$ are not identical or similar, they are at least only differing little from each other. In any case it is assumed that there is a common pitch angle $\theta$ and the pitch angles $\theta_1$, $\theta_2$ and $\theta_3$ only vary by small angles around such common pitch angle $\theta$. Such common pitch angle $\theta$ could just be the arithmetic mean value of the three pitch angles $\theta_1$, $\theta_2$ and $\theta_3$. However, another possibility is that the common pitch angle $\theta$ is set by a controller and this set value is used as the common pitch angle $\theta$.

As explained the common pitch angle $\theta$ could be the result of a measurement of the three pitch angles $\theta_1$, $\theta_2$ and $\theta_3$. It could also just be an information which is readily available by a controller controlling the wind turbine. However, for illustrative reasons there is a blade angle calculation circuitry (e.g., controller) 206 shown in FIG. 2 which may calculate the common pitch angle $\theta$ from the three pitch angles $\theta_1$, $\theta_2$ and $\theta_3$.

In order to estimate the wind speed $V_W$ there is suggested to use an observer (e.g., controller) 204. The observer 204 receives as input values the rotor speed n, the common pitch angle $\theta$ and the generator torque m. Instead of the generator torque m there could also be used the generator power or the power fed into an electrical supply grid by the wind turbine.

The rotor speed n may also be measured by using an incremental encoder or other sensor for measuring the rotor speed. Such incremental encoder could be inside the nacelle 104 close to the generator 202. As such incremental encoder is well-known, it is not shown in FIG. 2.

The generator torque m may be taken from a controller controlling such generator torque m. It may also be calculated based on the rotor speed n and a generator power of the generator 202. It is noted that instead of using the generator torque m as an input variable for the observer 204 the generator power may be used as well but the observer will of course be adapted accordingly.

The observer 204 comprises an observer model 208. This observer model 208 is illustrated inside of the observer 204 and it also illustrates that it basically comprises a model of the wind turbine. In addition, the observer 204, in particular the observer model 208 may incorporate particular dynamics or at least one dynamic behavior, which is not necessarily a technical part of the wind turbine. Such dynamic behavior may be the dynamic behavior of the wind 200 approaching the rotor 106 of the wind turbine 100 from an upwind position 210. Such upwind position 210 may be just in front of the rotor of the wind turbine and it may be in a distance of 5-100 m or 10-20 m.

Such behavior may also be incorporated in the observer 204, in particular in the observer model 208. This is illustrated by an augmented wind turbine model 212. This is just for illustrative reasons and it shall in particular illustrate that the wind speed, or other state variables which are not technically part of the wind turbine, may be considered as an augmented state variable. That shall be illustrated by the augmented wind turbine model 212.

The purpose for this observer 204 is thus to estimate the wind speed $V_W$ and accordingly the output of the observer 204 is the estimated wind speed $\hat{V}_W$.

This estimated wind speed $\hat{V}_W$ is used for controlling the wind turbine and is thus inputted into the controller 214. The controller 214 may thus control the wind turbine or it may be part of a general wind turbine controller. However, for the controller 214 two functions are illustrated, i.e., to determine a generator torque m based on the estimated wind speed and to determine a common pitch angle $\theta$ based on the estimated wind speed. This is indicated in the controller 214 as two simple formulas. However, one possibility to put that into practice is to use a corresponding operational curve. In particular, two such operational curves may be used and one may be a wind speed-torque curve and the other a wind speed-pitch angle curve. Thus, the wind speed-torque curve shows a relationship between said two values. The same applies to the wind speed-pitch angle curve.

Accordingly, the controller 214 determines a set value for the generator torque $m_s$ and also a set value for the common pitch angle $\theta_s$. These values are then used to control the wind turbine. The set value for the common pitch angle may be sent to pitch angle adjustment units (e.g., pitch drives) which may be located one for each rotor blade. The set value for the generator torque $m_s$ may be used to control a stator current of the generator, if the generator is a synchronous generator.

If the synchronous generator is having an adjustable excitation, adjusting such excitation may also or only be used to put the set value for the generator torque into practice.

Accordingly, by using the estimated wind speed $\hat{V}_W$ the operation of the wind turbine can be adapted to the actual wind speed. However, the quality of such operational concept depends on the quality of the estimated wind speed $\hat{V}_W$. It was realized that the variation of the wind speed by time or by location, cannot be predicted or measured in detail, but expected variations of the wind speed may statistically be considered. This way the observer and thus the estimated wind speed $\hat{V}_W$ can be improved.

Accordingly, it is suggested to incorporate expected variations of the wind as at least one stochastic variable and this stochastic variable is depicted in FIG. 2 as $V_{ar}V_w$. This is inputted into the observer and thereby considered by the observer. One possibility to put this into practice is to use a Kalman filter as the observer. Such Kalman filter is, as known by the skilled person, particularly designed to consider noise of measurements. However, it was found that it can also be used to consider the variations of the wind, in particular variations of the wind speed as such uncertainties and thus to incorporate such expected variations of the wind as at least one stochastic variable.

Figure 3:
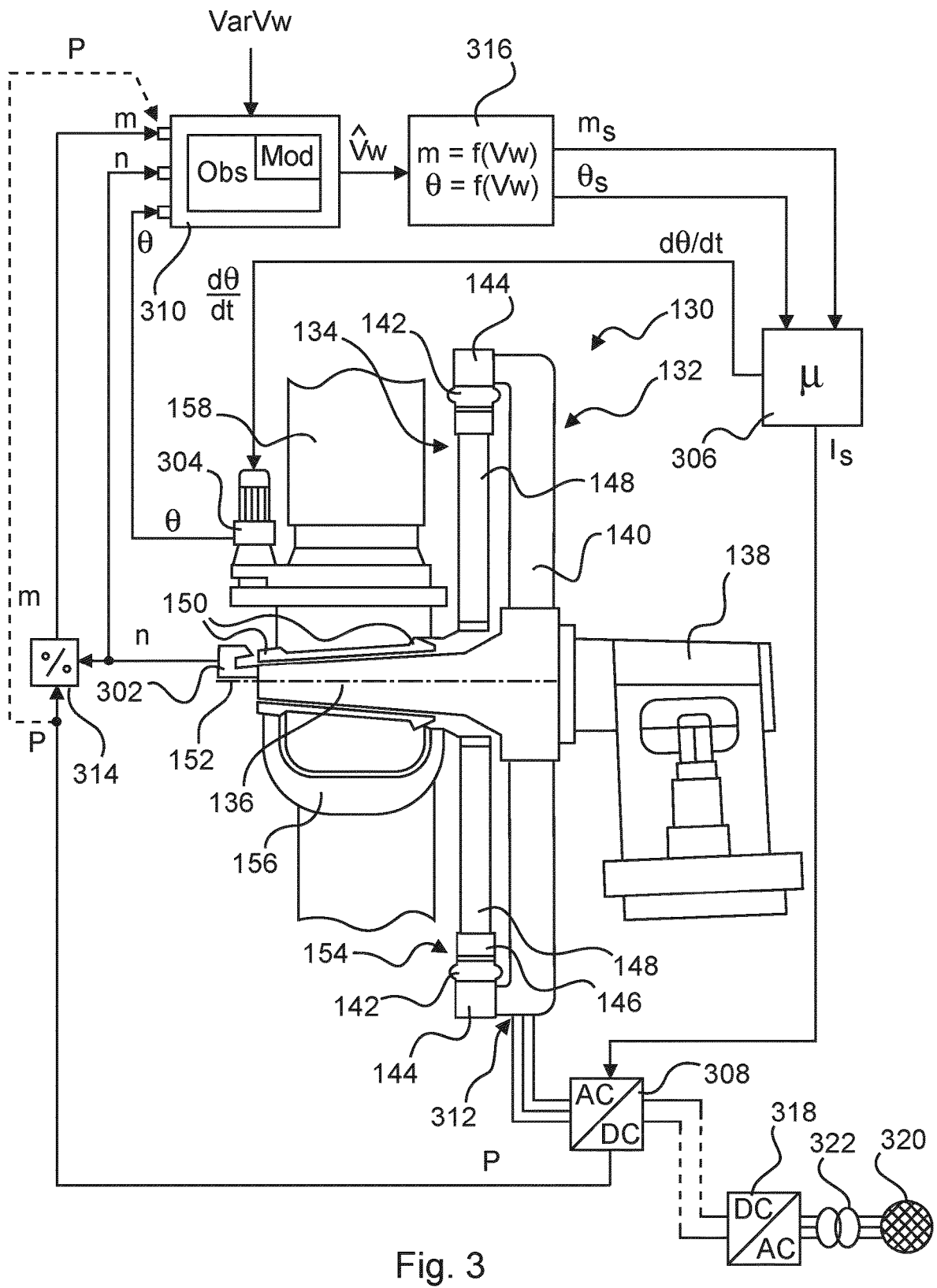
FIG. 3 shows part of a wind turbine including a generator, an observer and a control unit in a schematic view.

FIG. 3 shows a generator 130 in a side view in a schematic way. The generator comprises a stator 132 and an aerodynamic rotor 134 which is attached to the stator in a rotatable manner. The rotor 134 and the stator 132 are attached to a machine carrier by means of an axial journal 136. The stator 132 comprises a stator carrier 140 and a laminated core 142 forming stator poles of the generator 130 and which are attached to the stator ring 144 to the stator carrier. The electrodynamic rotor 134 comprises rotor shoes 146 forming the rotor poles and which are by means of a rotor carrier 148 and a bearing 150 supported rotatable around a rotational axis 152 supported on the axial journal 136. The stator laminated core 142 and rotor pole shoes 146 are only separated by a small air gap 154. In operation the electrodynamic rotor 134 of the generator 130 rotates with the rotor hub 156 of the aerodynamic rotor.

The aerodynamic rotor may be one as shown in FIG. 1 and FIG. 2 and only part of one rotor blade 158 is shown. In addition, a pitch actuator 304 for rotating said rotor blade 158 is also shown. This pitch actuator 304 may also comprise a sensor (e.g., accelerometer, gyroscope or inclinometer) for identifying the pitch angle of said rotor blade 158. The generator 130 as well as the machine carrier 138 may be inside a nacelle such as the nacelle 104 of FIG. 1. The machine carrier 138 may this way be located on top of a tower such as the tower 102 of FIG. 1.

In this respect FIG. 3 may thus show part of a wind turbine 100 according to FIG. 1 or FIG. 2. This wind turbine explained with respect to FIG. 3 is adapted for using an estimated wind speed for controlling the wind turbine. Such wind turbine comprises an aerodynamic rotor and this aerodynamic rotor is just as a simplification named rotor in this application, i.e., only the explicitly mentioning of an electrodynamic rotor according to FIG. 3 is directed to such electrodynamic rotor, i.e., to a runner of the generator. Any other mentioning of a rotor is directed to an aerodynamic rotor such as the aerodynamic rotor 106 of FIG. 1.

The aerodynamic rotor comprises three rotor blades 158 and each rotor blade 158 can be pivoted with respect to its pitch angle by means of a pitch actuator 304 which also comprises a pitch determination unit. This pitch actuator and thus pitch determination unit 304 may also output a common pitch angle θ. This common pitch angle θ may be inserted into the estimation unit (e.g., controller) 310 which comprises an observer (e.g., controller), such as the observer 204 of FIG. 3. The estimation unit 310 may even be identical with the observer. However, the estimation unit may in addition comprise electrical terminals or data terminals for connecting corresponding data buses, whereas the observer focusses on the functionality of estimating the wind speed.

The rotor hub 156 and thus the aerodynamic rotor rotates around the rotational axis 152. Therefore, it is supported in a rotatable manner by means of the bearing 150 to the axial journal 136. Accordingly, the axial journal 136 is fixed and the rotor hub 156 rotates relatively to the axial journal 136. Accordingly, a speed sensor (e.g., incremental encoder) 302 is fixed to the axial journal but is directed to one part of the rotor hub 156 in order to measure the rotor speed of this rotor hub 156 and thus of the aerodynamic rotor. However, the sensor may be attached at different locations, i.e., at the stator carrier 140 in order to sense the movement of the rotor carrier 148.

However, the speed sensor 302 outputs a speed signal n and that is inputted into the estimation unit 310.

In addition, the generator 130 and in particular the stator 132 have a stator output 312 for outputting a stator current. Such stator current may be a three-phase current or in other embodiments that may be a six-phase current, e.g., two three-phase currents. This can be inputted into a generator power unit 308, which is preferably an active rectifier as also shown in FIG. 3. It is proposed to use an active rectifier for any embodiments.

Such active rectifier, i.e., the generator power unit 308 can control the stator current and thus the output power of the generator. Accordingly, the output power is also known by this generator power unit 308 and this output power P is outputted in order to use it for the estimation unit 310.

FIG. 3 shows as a main suggestion to divide this output power P by the rotor speed n and that is illustrated by the dividing circuitry (e.g., controller) 314. The result is a generator torque m and this generator torque m may be inputted into the estimation unit 310.

However, as an alternative approach the output power P may directly be inputted into the estimation unit 310. That is indicated by the dotted line bypassing the dividing circuitry 314.

Thus, based on the pitch angle θ, the rotor speed n and the generator torque m the estimation unit estimates the estimated wind speed $\hat{V}_W$. In order to do that it also incorporates expected variations of the wind as at least one stochastic variable $V_{ar}V_w$.

The result is the estimated wind speed $\hat{V}_W$ and that is inputted into the controller sub circuitry (e.g., controller) 316. The controller sub circuitry 316 may work just as the controller 214 of FIG. 2.

The resulting set values for the generator torque ms and the set value for the common pitch angle $\theta_s$ is submitted to the turbine controller 306. The turbine controller 306 uses these variables, as well as other variables to control the wind turbine accordingly.

In particular, the turbine controller 306 may calculate a pitch angle speed dθ/dt in order to submit this pitch angle speed to the pitch actuator and thus pitch determination unit 304. Accordingly, the pitch actuator sets a pitch angle speed according to such set value and rotates the corresponding rotor blade accordingly. However, such calculation may also take place at a controller located at the pitch actuator.

The turbine controller 306 may also calculate a set value for the stator current in order to adjust the generator torque this way. Such set value for the stator current Is may be submitted to the generator power unit 308, i.e., to the active rectifier 308. The output current outputted by the generator 130 at the stator output 312 is controlled accordingly. However, that is just one possibility. It might also be possible that a controller which is part of the active rectifier and thus part of the generator power unit 308 may directly receive a set value for the generator torque ms and control the generator torque accordingly. In this case the generator power unit 308 may also receive a rotational speed, or it may determine such rotational speed according to the frequency of the stator current.

It may also be possible that instead of controlling the stator current or in addition of controlling the stator current, an excitation of the generator is controlled, if the generator is designed as such generator having an adjustable excitation.

The power generated by the generator is thus rectified by the active rectifier, i.e., the generator power unit 308 and this rectified current and voltage may be submitted to an inverter 318. This inverter 318 generates a three-phase current in order to feed this into the electrical supply grid 320 via the transformer 322.

In particular elements such as the dividing unit 314, the estimation unit 310, the controller sub circuitry 316 and the turbine controller 306 may be put into practice as part of a microcontroller and/or as a software block.

A generalized plant model is suggested and also described in C. Scherer, *Theory of Robust Control, Systems & Control group TU Delft*, 2007., Theorem 8, p. 26. That document is also depicted as 1 or Lit1 and herewith incorporated by reference. The generalized plant model represents a wind turbine with the following dynamics, which are just briefly listed here and which are described in more detail above and further below by way of example and using formulas:

Rotor wake (dynamic inflow)
Drive train
Generator
Pitch
Tower

The tower dynamics are identified using the subspace identification method Past-Input Multivariable Output-Error State sPace (PI-MOESP) method, described in V. Verdult M. Verhaegen, Filtering and System Identification: A Least Square Approach, Cambridge University Press, 2007, p. 320. That document is also depicted as 2 or Lit2 and herewith incorporated by reference. The identified model reproduces the following motions:

tower top sideways acceleration in m/s²
nacelle roll acceleration in rad/s²
tower top fore after acceleration in m/s²
nacelle tilt acceleration in rad/s²

In addition, for rotor speed measurement correction a nacelle roll velocity in rad/s is reproduced and for wind speed correction a tower top fore after velocity in m/s.

Such generalized plant model or a part thereof may be used as the observer model or the observer model may be based on this generalized plant model or on part of the generalized plant model.

The following mathematical description maybe used.

A state space realization of the generalized plant yields:

$$x(k+1) = A \cdot x(k) + B_{ctrl} \cdot u_{ctrl}(k) + B_{exog} \cdot u_{exog}(k) \quad (1)$$

$$y(k) = C^y \cdot x(k) + d_{ctrl}^y \cdot u_{ctrl}(k) + D_{exog}^y \cdot u_{exog}(k) \quad (2)$$

$$z(k) = C^z \cdot x(k) + D_{ctrl}^z \cdot u_{ctrl}(k) + D_{exog}^z \cdot u_{exog}(k) \quad (3)$$

for the system matrices and N the number of states:

| | | |
|---|---|---|
| $A$ | $\in \mathbb{R}^{N \times N}$ | State matrix |
| $B_{ctrl}$ | $\in \mathbb{R}^{N \times 4}$ | Coatrol-input matrix |
| $C^y$ | $\in \mathbb{R}^{10 \times N}$ | Measurement-output matrix |
| $D_{ctrl}^y$ | $\in \mathbb{R}^{10 \times 4}$ | Measurement-control feed through matrix |
| $D_{exog}^y$ | $\in \mathbb{R}^{10 \times 3}$ | Measurement-exogenous feed through matrix |
| $B_{exog}$ | $\in \mathbb{R}^{N \times 3}$ | Exogenous-input matrix |
| $C^z$ | $\in \mathbb{R}^{2 \times N}$ | Exogenous-out put matrix |
| $D_{ctrl}^z$ | $\in \mathbb{R}^{2 \times 4}$ | Exogenous-control feed through matrix |
| $D_{exog}^z$ | $\in \mathbb{R}^{2 \times 3}$ | Exogenous-exogenous feed through matrix |

Let:

State vector $x \in \mathbb{R}^N$:

| | | | |
|---|---|---|---|
| $x_{aero}^{wake}$ | $x_1^\alpha(k) - x_1^\alpha(k-1)$ | [m/s] | |
| | $x_1^t(k) - x_1^t(k-1)$ | [m/s] | Axial and tangential induction |
| | . | [m/s] | velocity change for |
| | . | | |
| | . | | |
| | $x_n^\alpha(k) - x_n^\alpha(k-1)$ | [m/s] | n annular sections |
| | $x_n^t(k) - x_n^t(k-1)$ | [m/s] | |
| $x_{generator}$ | | [Nm] | Generator torque |
| $x_{tower}$ | | [—] | Identified tower states |
| $x_{drive\ train}$ | $x_{\phi_r}$ | [rad] | Rotor azimuth |
| | $x_{\Omega_r}$ | [rad/s] | Rotor speed |
| $x_{pitch}$ | $x_{\theta_1}$ | [deg] | Pitch angle blade 1 |
| | $x_{\theta_2}$ | [deg] | Pitch angle blade 2 |
| | $x_{\theta_3}$ | [deg] | Pitch angle blade 3 |
| | $x_{k_1^{sp}}$ | [deg] | Delayed pitch rate setpoint blade 1 |
| | $x_{k_2^{sp}}$ | [deg] | Delayed pitch rate setpoint blade 2 |
| | $x_{k_3^{sp}}$ | [deg] | Delayed pitch rate setpoint blade 3 |
| $x_{k_U}$ | | [m/s] | Delayed free upstream wind speed |
| $x_{k_{\Omega_r}}$ | | [m/s] | Delayed rotor speed |
| $x_{k_\theta}$ | | [deg] | Delayed average pitch angle |

Exogenous-input vector $u_{exog} \in \mathbb{R}^3$:

| | | | |
|---|---|---|---|
| $u_{exog,U}$ | $U$ | [m/s] | Free upstream wind speed |
| $u_{exog,F}$ | $F_{axial}^{qs}$ | [N] | Rotor thrust quasi-static |
| $u_{exog,T}$ | $T_{rotor}^{qs}$ | [N] | Rotor torque quasi-static |

Measurement-ouput vector $y \in \mathbb{R}^{10}$:

| | | | |
|---|---|---|---|
| $y_{generator}$ | $T_{gen}$ | [Nm] | Generator torque |
| $y_{tower}$ | $\alpha_{sw}^{tow}$ | [m/s²] | Tower top side ways acceleration |
| | $\alpha_{roll}^{nac}$ | [rad/s²] | Nacelle roll acceleration |
| | $\alpha_{fa}^{tow}$ | [m/s²] | Tower top fore after acceleration |
| | $\alpha_{tilt}^{nac}$ | [rad/s²] | Nacelle tilt acceleration |
| $y_{drive\ train}$ | $\phi_r$ | [rad] | Rotor azimuth |
| | $\Omega_r$ | [rad/s²] | Rotor speed |
| $y_{pitch}$ | $\theta_1$ | [deg] | Pitch angle blade 1 |
| | $\theta_2$ | [deg] | Pitch angle blade 2 |
| | $\theta_3$ | [deg] | Pitch angle blade 3 |

Exogenous-output vector $z \in \mathbb{R}^2$:

| | | | |
|---|---|---|---|
| $z_F$ | $F_{axial}$ | [N] | Rotor thrust quasi-static + wake |
| $z_P$ | $P_{rotor}$ | [W] | Rotor power quasi-static + wake |

Control-input vector $u_{ctrl} \in \mathbb{R}^4$:

| | | | |
|---|---|---|---|
| $u_{generator}$ | $T_{gen}^{sp}$ | [Nm] | Generator torque setpoint |
| $u_{pitch}$ | $\theta_1^{sp}$ | [deg/s] | Pitch rate setpoint blade 1 |
| | $\theta_2^{sp}$ | [deg/s] | Pitch rate setpoint blade 2 |
| | $\theta_3^{sp}$ | [deg/s] | Pitch rate setpoint blade 3 |

Let the structure of the state space system of Eq. 1, 2 and 3 satisfy:

$$\underbrace{\begin{pmatrix} x_{aero}^{wake}(k+1) \\ x_{generator}(k+1) \\ x_{tower}(k+1) \\ x_{drive\ train}(k+1) \\ x_{pitch}(k+1) \\ x_{k_U}(k+1) \\ x_{k_{\Omega_r}}(k+1) \\ x_{k_\theta}(k+1) \end{pmatrix}}_{x(k+1)} =$$

$$\underbrace{\begin{pmatrix} A_{aero}^{wake} & 0 & 0 & B_{aero,\Omega_r}^{wake} \cdot D_{k_{\Omega_r}} \cdot C_{\Omega_r} & B_{aero,\theta}^{wake} \cdot D_{k_\theta} \cdot C_\theta & B_{aero,U}^{wake} \cdot C_{k_U} & B_{aero,\theta}^{wake} \cdot C_{k_{\Omega_r}} & B_{aero,\theta}^{wake} \cdot C_{k_\theta} \\ 0 & A_{generator} & 0 & 0 & 0 & 0 & 0 & 0 \\ B_{tower}^F \cdot C_{aero,F}^{wake} & B_{tower}^{Tg} \cdot C_{generator} & A_{tower} & 0 & 0 & 0 & 0 & 0 \\ B_{drive\ train}^{T_r} \cdot C_{aero,T_r}^{wake} & B_{drive\ train}^{Tg} \cdot C_{generator} & 0 & A_{drive\ train} & 0 & 0 & 0 & 0 \\ 0 & 0 & 0 & 0 & A_{pitch} & 0 & 0 & 0 \\ 0 & 0 & 0 & 0 & 0 & A_{k_U} & 0 & 0 \\ 0 & 0 & 0 & B_{k_{\Omega_r}} \cdot C_{\Omega_r} & 0 & 0 & A_{k_{\Omega_r}} & 0 \\ 0 & 0 & 0 & 0 & B_{k_\theta} \cdot C_\theta & 0 & 0 & A_{k_\theta} \end{pmatrix}}_{A} \cdot$$

$$\underbrace{\begin{pmatrix} x_{aero}^{wake}(k) \\ x_{generator}(k) \\ x_{tower}(k) \\ x_{drive\ train}(k) \\ x_{pitch}(k) \\ x_{k_U}(k) \\ x_{k_{\Omega_r}}(k) \\ x_{k_\theta}(k) \end{pmatrix}}_{x(k)} + \underbrace{\begin{pmatrix} 0 & 0 \\ B_{generator} & 0 \\ 0 & 0 \\ 0 & 0 \\ 0 & B_{pitch} \\ 0 & 0 \\ 0 & 0 \\ 0 & 0 \end{pmatrix}}_{B_{ctrl}} \cdot \underbrace{\begin{pmatrix} u_{generator}(k) \\ u_{pitch}(k) \end{pmatrix}}_{u_{control}(k)} + \underbrace{\begin{pmatrix} B_{aero,U}^{wake} \cdot D_{k_U} & 0 & 0 \\ 0 & 0 & 0 \\ 0 & B_{tower}^F & 0 \\ 0 & 0 & B_{drive\ train}^{T_r} \\ 0 & 0 & 0 \\ B_{k_U} & 0 & 0 \\ 0 & 0 & 0 \\ 0 & 0 & 0 \end{pmatrix}}_{B_{exog}} \cdot \underbrace{\begin{pmatrix} U(k) \\ y_{aero,F}^{qs}(k) \\ y_{aero,T_r}^{qs}(k) \end{pmatrix}}_{u_{exog}(k)}$$

$$\underbrace{\begin{pmatrix} \overbrace{z(k)}^{} \\ y_{aero}(k) \\ y_{generator}(k) \\ y_{tower}(k) \\ y_{drive\ train}(k) \\ y_{pitch}(k) \end{pmatrix}}_{y(k)} = \underbrace{\begin{pmatrix} \overbrace{\begin{matrix} C_{aero}^{wake} & 0 & 0 & 0 & 0 & 0 & 0 & 0 \end{matrix}}^{C^z} \\ \begin{matrix} 0 & C_{generator} & 0 & 0 & 0 & 0 & 0 & 0 \\ D_{tower}^F \cdot C_{aero,F}^{wake} & D_{tower}^{T_\theta} \cdot C_{generator} & C_{tower} & 0 & 0 & 0 & 0 & 0 \\ 0 & 0 & 0 & C_{drive\ train} & 0 & 0 & 0 & 0 \\ 0 & 0 & 0 & 0 & C_{pitch} & 0 & 0 & 0 \end{matrix}_{\underbrace{}_{C^y}} \end{pmatrix}} \cdot \begin{pmatrix} x_{aero}^{wake}(k) \\ x_{generator}(k) \\ x_{tower}(k) \\ x_{drive\ train}(k) \\ x_{pitch}(k) \\ x_{k_U}(k) \\ x_{k_{\Omega_r}}(k) \\ x_{k_\theta}(k) \end{pmatrix}_{x(k)} +$$

$$\underbrace{\begin{pmatrix} \overbrace{\begin{matrix}0 & 0\end{matrix}}^{D_{ctrl}^z} \\ \begin{matrix} 0 & 0 \\ 0 & 0 \\ 0 & 0 \\ 0 & 0 \\ 0 & 0 \end{matrix} \end{pmatrix}}_{D_{ctrl}^y} \cdot \underbrace{\begin{pmatrix} u_{generator}(k) \\ u_{pitch}(k) \end{pmatrix}}_{u_{control}(k)} + \underbrace{\begin{pmatrix} \overbrace{\begin{matrix} 0 & 1 & 0 \end{matrix}}^{D_{exog}^z} \\ \begin{matrix} 0 & 0 & \Omega_r(k) \\ 0 & 0 & 0 \\ 0 & D_{tower}^F & 0 \\ 0 & 0 & 0 \\ 0 & 0 & 0 \end{matrix} \end{pmatrix}}_{D_{exog}^y} \cdot \underbrace{\begin{pmatrix} U(k) \\ y_{aero,F}^{qs}(k) \\ y_{aero,T_r}^{qs}(k) \end{pmatrix}}_{u_{exog}(k)}$$

In particular, the following two Kalman filter types maybe used:
dual square{root covariance Kalman filter (DSRCKF)
augmented{state extended square{root covariance Kalman filter (AESRCKF)
With respect to the DSRCKF the below mentioned processes are discussed:
Generalized plant
Velocity supplement for rotor speed measurement and wind speed correction
Random walk modelled rotor (aerodynamic) torque for wind speed reconstruction
Process (Generalized Plant):

$$x(k+1)=A \cdot x(k)+B_{ctrl} \cdot u_{ctrl}(k)+B_{exog} \cdot u_{exog}(k)+w_x(k)$$

$$y(k)=C^y \cdot x(k)+D_{ctrl}^y \cdot u_{ctrl}(k)+D_{exog}^y \cdot u_{exog}(k)+v_y(k)$$

for the random Gaussian variables:

$$w_x(k)=w_x(k)+Q^x(k) \cdot w^x(k),\ w^x \sim (0,I)$$

$$w_y(k)=w_y(k)+R^y(k) \cdot v^y(k),\ v^y \sim (0,I)$$

For a minimum-variance unbiased state estimate to become feasible assume:

$$\mathbb{E}\{w_x(k)w_x^T(l)\}=[Q^x(k)]^2 \cdot \delta(k-l) \geq 0,\ w_x=w_y=0$$

$$\mathbb{E}\{v_y(k)v_y^T(l)\}=[R^y(k)]^2 \cdot \delta(k-l)>0,$$

Model & Filter:
Measurement Update $$\vec{y}(k)=C^y \cdot \hat{x}(k|k-1)+D_{ctrl}^y \cdot u_{ctrl}(k) \quad (4)$$

for a output estimate $\hat{y}(k)$ and state estimate $\hat{x}(k|k-1)$ at time k given by the information at time k−1.
Time Update $$\hat{x}(k+1|k)=A \cdot \hat{x}(k|k-1)+B_{ctrl} \cdot u_{ctrl}(k)+K^x \cdot (y(k)-\hat{y}(k)) \quad (5)$$

for a one-step-ahead predicted state estimate $\hat{x}(k+1|k)$ and a Kalman gain $K^x$.
Process (Velocity Supplement):

$$x_v(k+1)=x_v(k)+T_s \cdot u_v(k)+w_v(k),\ u_v=[a_{roll}^{nac} a_{fa}^{tow}]^T$$

$$y_v(k)=x_v(k)+v_v(k),\ x_v=[\omega_{roll}^{nac} v_{fa}^{tow}]^T$$

for the random Gaussian variables:

$$w_v(k)=w_v(k)+Q^v(k) \cdot w^v(k),\ w^v \sim (0,I)$$

$$v_v(k)=v_v(k)+R^v(k) \cdot v^v(k),\ v^v \sim (0,I)$$

For a minimum-variance unbiased state estimate to become feasible assume:

$$\mathbb{E}\{w_v(k)w_v^T(l)\}=[Q^v(k)]^2 \cdot \delta(k-l) \geq 0,\ w_v=v_v=0$$

$$\mathbb{E}\{v_v(k)v_v^T(l)\}=[R^v(k)]^2 \cdot \delta(k-l)>0,$$

Model & Filter:
Measurement Update $$\hat{y}_v(k)=\hat{x}_v(k|k-1) \quad (6)$$

for a output estimate $\hat{y}_v(k)$ and state estimate $\hat{x}_v(k|k-1)$ at time k given by the information at time k−1.
Time Update $$\hat{x}_v(k+1|k)=\hat{x}_v(k|k-1)+T_s \cdot \hat{u}_v(k)+K^v \cdot (y_v(k)-\hat{y}_v(k)) \quad (7)$$

for a one-step-ahead predicted state estimate $\hat{x}_v(k+1|k)$ and a Kalman gain $K^v$.

Rotor Speed Measurement Correction
The output estimated rotor speed $\hat{\Omega}_r$ from the generalized plant Kalman filter Eq. 4-5 is corrected with:

$$\hat{\Omega}_r(k)=\hat{x}_{\Omega_r}(k|k-1)-\hat{\omega}_{roll}^{nac}(k|k-1) \quad (8)$$

for the estimated nacelle roll velocity $\omega_{roll}^{nac}$.
Process (random walk modelled rotor torque):

$$u_{exog,T}(k+1)=u_{exog,T}(k)+w_{exog,T}(k),\ u_{exog,T}(k)=T_{rotor}^{qs}$$

$$y_{exog,T}(k)=u_{exog,T}(k)+v_{exog,T}(k),\ y_{exog,T}(k)=B_{exog,T}^{-1} \cdot K^x \cdot (y(k)-\hat{y}(k))$$

for the random Gaussian variables:

$$w_{exog,T}(k)=Q_{exog,T}(k) \cdot w^{exog,T}(k),\ w^{exog,T} \sim (0,I)$$

$$v_{exog,T}(k)=R_{exog,T}(k) \cdot v^{exog,T}(k),\ v^{exog,T} \sim (0,I)$$

For a minimum-variance unbiased state estimate to become feasible assume:

$$\mathbb{E}\{w_{exog,T}(k)w_{exog,T}^T(l)\}=[Q_{exog,T}(k)]^2 \cdot \delta(k-l) \geq 0,$$

$$\mathbb{E}\{v_{exog,T}(k)v_{exog,T}^T(l)\}=[R_{exog,T}(k)]^2 \cdot \delta(k-l)>0,$$

Model & Filter:
Measurement Update $$\hat{y}_{exog,T}(k)=\hat{u}_{exog,T}(k|k-1) \quad (9)$$

$$\hat{u}_{exog,T}(k|k)=\hat{u}_{exog,T}(k|k-1)+K^{exog,T} \cdot (y_{exog,T}(k)-\hat{y}_{exog,T}(k)) \quad (10)$$

for a filtered state estimate $\hat{u}_{exog,T}(k|k)$ and a Kalman gain $K^{exog,T}$.
Time Update $$\hat{u}_{exog,T}(k+1|k)=\hat{u}_{exog,T}(k|k)$$

for a one-step-ahead predicted state estimate $\hat{u}_{exog,T}(k+1|k)$.
Wind Speed Reconstruction & Correction
A rotor effective wind speed $\hat{U}_{rotor}$ is acquired from:

$$\hat{U}_{rotor}(k)=f(\hat{x}_{\Omega_r}(k|k-1),\hat{y}_\theta(k),\hat{u}_{exog,T}(k|k)) \quad (12)$$

where $f$ is the function as a result of the optimization problem subjected to:
$\hat{x}_{\Omega_r}(k|k-1)$ state estimated rotor speed
$\hat{y}_\theta(k)$ output estimated pitch angle (average from 3 blades)
$\hat{u}_{exog,T}$ filtered rotor torque estimate
and a set of polynomial functions for the aero efficiency.
Next, a free upstream wind speed U can be obtained from:

$$\hat{U}(k)=\hat{U}_{rotor}(k)+\hat{v}_{fa}^{tow}(k|k-1) \quad (13)$$

for the estimated tower top fore after velocity $\hat{v}_{fa}^{tow}$.
With respect to the AESRCKF the below mentioned processes are discussed:
Generalized plant
Velocity supplement for rotor speed measurement and wind speed correction
Random walk modelled free upstream wind speed for wind speed estimation Process (Generalized plant):

$$x(k+1)=A \cdot x(k)+B_{ctrl} \cdot u_{ctrl}(k)+B_{exog} \cdot u_{exog}(k)+w_x(k)$$

$$y(k)=C^y \cdot x(k)+D_{ctrl}^y \cdot u_{ctrl}(k)+D_{exog}^y \cdot u_{exog}(k)+v_y(k)$$

for the random Gaussian variables:

$$w_x(k)=w_x(k)+Q^x(k) \cdot w^x(k),\ w^x \sim (0,I)$$

$$v_y(k)=v_y(k)+R^y(k) \cdot v^y(k),\ v^y \sim (0,I)$$

For a minimum-variance unbiased state estimate to become feasible assume:

$$\mathbb{E}\{w_x(k)w_x^T(l)\}=[Q^x(k)]^2\cdot\delta(k-l)\geq 0,\ w_x=w_y=0$$

$$\mathbb{E}\{v_y(k)v_y^T(l)\}=[R^y(k)]^2\cdot\delta(k-l)>0,$$

Process (Velocity Supplement):

$$x_v(k+1)=x_v(k)+T_s\cdot u_v(k)+w_v(k),\ u_v=[\alpha_{roll}^{nac} a_{fa}^{tow}]^T$$

$$y_v(k)=x_v(k)+v_v(k),\ x_v=[\omega_{roll}^{nac} v_{fa}^{tow}]^T$$

for the random Gaussian variables:

$$w_v(k)=w_v(k)+Q^v(k)\cdot w^v(k),\ w^v\sim(0,I)$$

$$v_v(k)=v_v(k)+R^v(k)\cdot v^v(k),\ v^v\sim(0,I)$$

For a minimum-variance unbiased state estimate to become feasible assume:

$$\mathbb{E}\{w_v(k)w_v^T(l)\}=[Q^v(k)]^2\cdot\delta(k-l)\geq 0,\ w_v=v_v=0$$

$$\mathbb{E}\{v_v(k)v_v^T(l)\}=[R^v(k)]^2\cdot\delta(k-l)>0,$$

Process (random walk modelled free upstream wind speed):

$$x_u(k+1)=x_u(k)+w_u(k)$$

for the random Gaussian variable:

$$w_u(k)=Q^u(k)\cdot w^u(k),\ w^u\sim(0,I)$$

For a minimum-variance unbiased state estimate to become feasible assume:

$$\mathbb{E}\{w_u(k)w_u^T(l)\}=[Q_u(k)]^2\cdot\delta(k-l)\geq 0$$

Model & Filter (Generalized Plant+Velocity Supplement+Wind Speed):
Measurement Update
Measurement-Output Estimate:

$$\hat{y}(k)=C^y\cdot\hat{x}(k|k-1)+D_{ctrl}^y\cdot u_{ctrl}(k)+D_{exog}^y\cdot\hat{u}_{exog}(k|k-1) \quad (14)$$

$$\hat{y}_v(k)=\hat{x}_v(k|k-1) \quad (15)$$

Exogenous-Output Estimate:

$$\hat{z}(k)=C^z\cdot\hat{x}(k|k-1)+D_{ctrl}^z\cdot u_{ctrl}(k)+D_{exog}^z\cdot\hat{u}_{exog}(k|k-1) \quad (16)$$

for a state estimate $x(k|k-1)$, velocity-state estimate $x_v(k|k-1)$ and exogenous-input estimate $\hat{u}_{exog}(k|k-1)$ at time k given by the information at time k−1.

The measurement-output estimated rotor speed $\hat{\Omega}_r$ from Eq. 14 is corrected with:

$$\hat{\Omega}_r=\hat{x}_{\Omega_r}(k|k-1)-\omega_{roll}^{nac}(k|k-1) \quad (17)$$

for the state estimated nacelle roll velocity $\hat{\omega}_{roll}^{nac}$.
Filtered State Estimate:

$$\hat{x}(k|k)=\hat{x}(k|k-1)+K^x[\hat{x}(k|k-1),\hat{x}_u(k|k-1)]\cdot(y(k)-\hat{y}(k)) \quad (18)$$

$$\hat{x}_u(k|k)=\hat{x}_u(k|k-1)+K^u[\hat{x}(k|k-1),\hat{x}_u(k|k-1)]\cdot(y(k)-\hat{y}(k)) \quad (19)$$

for a generalized plant Kalman gain $K^x$ and free upstream wind speed Kalman gain $K^u$.
Filtered Exogenous-Input Estimate:

$$\hat{u}_{exog}(k|k)=\begin{pmatrix}\hat{x}_u(k|k)\\\hat{F}_{axial}^{qs}[\hat{x}(k|k),\hat{x}_u(k|k)-\hat{v}_{fa}^{tow}(k|k-1)]\\\hat{T}_{rotor}^{qs}[\hat{x}(k|k),\hat{x}_u(k|k)-\hat{v}_{fa}^{tow}(k|k-1)]\end{pmatrix} \quad (20)$$

for the state estimated tower top fore after velocity $\hat{v}_{fa}^{tow}$.

Time Update
One-Step-Ahead Predicted State Estimate:

$$\hat{x}(k+1|k)=A\cdot\hat{x}(k|k)+B_{ctrl}\cdot u_{ctrl}(k)+B_{exog}\cdot\hat{u}_{exog}(k|k) \quad (21)$$

$$\hat{x}_v(k+1|k)=\hat{x}_v(k|k-1)+T_s\cdot\hat{u}_v(k)+K^v\cdot(y_v(k)-\hat{y}_v(k)) \quad (22)$$

$$\hat{x}_u(k+1|k)=\hat{x}_u(k|k) \quad (23)$$

for a filtered state estimate $\hat{x}(k|k)$, filtered free upstream wind speed estimate $\hat{x}_u(k|k)$, filtered exogenous-input estimate $\hat{u}_{exog}(k|k)$ and velocity supplement Kalman gain $K^v$.
One-Step-Ahead Predicted Exogenous-Input Estimate:

$$\hat{u}_{exog}(k+1|k)=\begin{pmatrix}\hat{x}_u(k+1|k)\\\hat{F}_{axial}^{qs}[\hat{x}(k+1|k),\hat{x}_u(k+1|k)-\hat{v}_{fa}^{tow}(k+1|k)]\\\hat{T}_{rotor}^{qs}[\hat{x}(k+1|k),\hat{x}_u(k+1|k)-\hat{v}_{fa}^{tow}(k+1|k)]\end{pmatrix} \quad (24)$$

for the one-step-ahead predicted state estimated tower top fore after velocity $\hat{v}_{fa}^{tow}$.

The invention claimed is:

1. A method for controlling a wind turbine using an estimated wind speed, wherein the wind turbine includes:
   a rotor operable to rotate with a variable rotor speed and having a plurality of rotor blades with a plurality of adjustable pitch angles, respectively; and
   a generator configured to control a generator torque or an output power of the generator, the method comprising:
      measuring the rotor speed;
      determining a common pitch angle representative of at least one or the plurality of adjustable pitch angles of the plurality of rotor blades;
      determining the generator torque or the output power of the generator; and
      estimating the wind speed using an observer, wherein the observer is configured to:
         use a model of the wind turbine as an observer model;
         use a measured rotor speed, the determined common pitch angle and at least one of the determined generator torque or the determined output power as input variable; and
         incorporate expected variations of wind as at least one stochastic variable,
      wherein the observer is a Kalman filter,
      wherein the observer model provides an estimated rotor speed, an estimated common pitch angle and at least one of an estimated generator torque or an estimated output power as output variables, and
      wherein:
         the wind turbine is controlled depending on the estimated wind speed;
         the plurality of adjustable pitch angles are adjusted depending on the estimated wind speed;
         the generator torque or the output power is adjusted depending on the estimated wind speed;
         the wind turbine is controlled depending on the estimated wind speed as the main input variable; and/or
         the wind turbine is controlled depending on the estimated wind speed as the only input variable.

2. The method according to claim 1, wherein the observer model includes one or more sub-models each representing a dynamic characteristic of at least one of:
an aerodynamic wake,
at least one of the plurality of rotor blades,
a drive train,
the generator,
at least one actuator for adjustment of at least one of the plurality of adjustable pitch angles,
a tower,
at least one structural imbalance, and
a rotor wind distribution of a rotor field covered by the rotor when rotating.

3. The method according to claim 1, wherein the observer uses at least one nonlinear characteristic of the wind turbine such that a linear observer model is used and the at least one nonlinear characteristic of the wind turbine is considered by at least one time variant parameter.

4. The method according to claim 1, wherein:
the observer model includes a blade model of at least one rotor blade of the plurality of rotor blades, and
the blade model includes:
a plurality of blade sections of the at least one rotor blade for evaluating dynamic characteristics of the plurality of blade sections, and/or
a sub model for modelling a torsional characteristics of the at least one rotor blade and/or the plurality of blade sections.

5. The method according to claim 1, wherein:
the observer model has a plurality of model parameters, and
at least one of:
the observer model is determined using system identification or the plurality of model parameters or a subset of the plurality of model parameters are determined using parameter identification, and
the observer model, the plurality of model parameters, the subset of the plurality of model parameters and/or control of the wind turbine is adjusted based on the estimated wind speed.

6. The method according to claim 5, wherein the observer model, the plurality of model parameters, the subset of the plurality of model parameters and/or the control of the wind turbine is adjusted based on a measured wind speed.

7. The method according to claim 1, comprising:
estimating, by the observer and/or the observer model, a wind speed and/or a wind field upstream of the rotor.

8. The method according to claim 1, comprising:
measuring the wind speed; and
determining a wind speed value depending on the estimated wind speed and the measured wind speed.

9. The method according to claim 8, wherein:
the wind speed is measured using a light detection and ranging (LIDAR) device, and
the method comprises:
combining the estimated wind speed and the measured wind speed using a weighting function.

10. The method according to claim 9, wherein the weighting function depends on an accuracy of the observer and/or on an accuracy of wind speed measurement.

11. The method according to claim 1, wherein a movement value representing a movement of an element of the wind turbine carrying a sensor is input to the observer as a disturbance value.

12. The method according to claim 11, wherein a movement of a stator of the generator carrying a speed sensor for measuring the rotor speed is input to the observer as the disturbance value.

13. The method according to claim 1, wherein the observer model is configure such that an upstream wind speed that is upstream of the rotor is used as an augmented state variable of the observer model.

14. The method according to claim 1, wherein the expected variations of the wind are determined based on a weather forecast or variations of the measured rotor speed.

15. The method according to claim 1, comprising:
comparing the estimated rotor speed, the estimated common pitch angle and the at least one of the estimated generator torque or the estimated output power with the measured rotor speed, the determined common pitch angle and the at least one of the determined generator torque or the determined output power; and/or
refraining from using the wind speed as an input variable to the observer model.

16. A wind turbine operative to be controlled using an estimated wind speed, the wind turbine comprising:
a rotor operative to rotate with a variable rotor speed and having a plurality of rotor blades with a plurality of adjustable pitch angles, respectively;
a generator configured to control a generator torque;
a sensor configured measure the rotor speed;
a pitch actuator configured to determine a common pitch angle representative of at least one or the plurality of adjustable pitch angles of the plurality rotor blades;
an active rectifier configured to determine a generator torque or an output power of the generator; and
a wind turbine controller configured to:
control the wind turbine; and
use an observer for estimating the wind speed, wherein the observer is configured to:
use a model of the wind turbine as an observer model;
use the measured rotor speed, the determined common pitch angle and at least one of the determined generator torque or the determined output power as input variables to the observer; and
incorporate expected variations of wind as at least one stochastic variable,
wherein the observer is a Kalman filter, and
wherein the observer model provides an estimated rotor speed, an estimated common pitch angle and one of an estimated generator torque or an estimated output power as output variables for comparison with the measured rotor speed, the determined common pitch angle and the at least one of the determined generator torque or the determined output power, respectively.

* * * * *